US010245557B2

(12) United States Patent
Jhon et al.

(10) Patent No.: US 10,245,557 B2
(45) Date of Patent: Apr. 2, 2019

(54) METHOD OF MANUFACTURING NANOPOROUS GRAPHENE MEMBRANE

(71) Applicant: KOREA INSTITUTE OF SCIENCE AND TECHNOLOGY, Seoul (KR)

(72) Inventors: Young Min Jhon, Seoul (KR); Young In Jhon, Seoul (KR); Seok Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/822,079

(22) Filed: Nov. 24, 2017

(65) Prior Publication Data

US 2018/0147542 A1    May 31, 2018

(30) Foreign Application Priority Data

Nov. 25, 2016 (KR) .................. 10-2016-0158342

(51) Int. Cl.
| | | |
|---|---|---|
| C03C 15/00 | (2006.01) | |
| B01D 67/00 | (2006.01) | |
| B01D 71/02 | (2006.01) | |
| C01B 32/194 | (2017.01) | |
| C01B 32/198 | (2017.01) | |

(52) U.S. Cl.
CPC ....... B01D 67/0062 (2013.01); B01D 67/009 (2013.01); B01D 67/0093 (2013.01); B01D 71/021 (2013.01); C01B 32/194 (2017.08); C01B 32/198 (2017.08); B01D 2323/34 (2013.01); C01B 2204/04 (2013.01)

(58) Field of Classification Search
CPC .. C01B 32/194; C01B 21/198; B01D 67/0062
USPC ....................................................... 216/56, 65
See application file for complete search history.

(56) References Cited

U.S. PATENT DOCUMENTS

| | | | | |
|---|---|---|---|---|
| 2013/0249147 | A1* | 9/2013 | Bedworth | ........... C01B 31/0484 264/483 |
| 2013/0309571 | A1* | 11/2013 | Yoon | ...................... H01M 4/583 429/213 |
| 2014/0147648 | A1* | 5/2014 | Zhamu | ...................... C30B 5/00 428/220 |
| 2016/0025693 | A1* | 1/2016 | Lee | ........................ G01N 21/75 436/4 |

(Continued)

FOREIGN PATENT DOCUMENTS

| | | | | |
|---|---|---|---|---|
| KR | 10-2014-0114765 A | | 9/2014 | |
| KR | 20140114765 A | * | 9/2014 | ............ H01M 4/133 |

OTHER PUBLICATIONS

Korean Office Action dated May 16, 2018.

(Continued)

*Primary Examiner* — Binh X Tran
(74) *Attorney, Agent, or Firm* — Rabin & Berdo, P.C.

(57) ABSTRACT

One aspect of the disclosed is to provide a method of manufacturing a nanoporous multilayer graphene membrane, including a first step of oxidizing a surface of a multilayer graphene membrane, a second step of reducing the oxidized surface of the multilayer graphene to carry out reductive etching such that oxidized carbon atoms on the surface are naturally and randomly dispersed, and a third step of repeatedly performing a series of the first and the second steps until nanopores penetrating the multilayer graphene are formed.

16 Claims, 10 Drawing Sheets

(56) References Cited

U.S. PATENT DOCUMENTS

2016/0285095 A1* 9/2016 Kang .................... H01M 4/133
2016/0340797 A1* 11/2016 Ozyilmaz ................. C30B 1/02
2017/0106342 A1* 4/2017 Raveendran-Nair ........................
                                                     G01N 15/082
2017/0157570 A1* 6/2017 Chu ....................... B01D 69/12

OTHER PUBLICATIONS

David Cohen-Tanugi et al., "Water Desalination across Nanoporous Graphene", NANO Letters, 2012, pp. 3602-3608, vol. 12.
Sumedh P. Surwade et al., "Water Desalination Using Nanoporous Single-Layer Graphene with Tunable Pore Size", Nat. Nanotechnol., 2015, pp. 459-464, vol. 10.

* cited by examiner top layer next to top layer

METHOD OF MANUFACTURING NANOPOROUS GRAPHENE MEMBRANE

CROSS-REFERENCE TO RELATED APPLICATION

This application claims priority to and the benefit of Korean Patent Application No. 2016-0158342, filed on Nov. 25, 2016, the disclosure of which is incorporated herein by reference in its entirety.

BACKGROUND

1. Field of the Invention

The present invention relates to a method of manufacturing a nanoporous multilayer graphene membrane, and more specifically, to a method of forming nanopores in a multilayer graphene membrane by repeatedly performing a series of oxidation-reduction processes on a surface of a multilayer graphene membrane to continuously carry out micro-etching in a randomly dispersed form by reduction.

2. Discussion of Related Art

A nanoporous membrane is a membrane having arranged or random pores of approximately 0.4 to 100 nanometers, and particularly, for efficient ion separation, small pores having a size of several nanometers or subnanometers are required. In the case of nanoporous membranes, generally, as the thickness is reduced, the flow of fluid passing through the membrane increases with respect to the same amount of pressure, and the refinement processing amount per unit time increases. However, it is not easy to make the thickness of nanoporous membranes as thin as an atomic level, and when the thickness is excessively small, there is a problem of not being able to achieve enough mechanical strength to endure the pressure during a refinement process.

Graphene is a two-dimensional sheet in which $sp^2$-bonded carbon atoms are formed in a hexagonal honeycomb lattice, and while graphene has a very small thickness at a size of a single atomic layer, its mechanical strength is very excellent. Therefore, when a nanoporous graphene membrane in which nanopores are formed in a graphene membrane is used as a separation membrane for impurities at a molecular level, the refinement processing amount per unit time can be significantly increased compared to conventional nanoporous membranes (*Nano Lett.*, Vol. 12, 3602-3608 (2012), *Nat. Nanotechnol.*, Vol. 10, 459-464 (2015)).

However, the small thickness of a graphene layer is not always beneficial. The thickness of a single atomic layer of a graphene membrane may cause a problem in which a graphene membrane can be easily wrinkled during transfer and application. In addition, in the case of a large-area single-layer graphene membrane of polycrystals, undesirably large pores are formed due to a high etching rate of grain boundaries.

Examples of conventional methods of forming pores in a graphene membrane include a method using an e-beam, a high-temperature oxidative etching method, and the like. The method using an e-beam may form very fine holes at a size of several atoms on a graphene membrane by using the e-beam, but it is difficult to produce many nanopores on a graphene membrane because the manufacturing cost is excessively high. On the other hand, in the high-temperature oxidative etching method, a graphene membrane is oxidatively attacked with oxygen gas at a high temperature of 500 to 600° C. to cause damage of the surface of graphene, thereby forming pores, and in general, the size of formed pores is as large as several hundred nanometers. In addition, when the method is applied to multilayer large-area graphene, there is a problem in which large-sized pores are formed due to intensive oxidative attack along grain boundaries, which is caused by the high reactivity of grain boundaries.

Meanwhile, in a method of manufacturing graphene pores using a mask-based patterning technique used in a semiconductor device process, an etched size (critical dimension) is determined depending on the resolution of patterning etching, which generally corresponds to a size of several tens of nanometers (at a size of 10 nanometers even when using the latest techniques). Therefore, it is difficult to form pores of less than 10 nanometers, and since a lithography process is required for patterning, a high manufacturing cost is required.

SUMMARY OF THE INVENTION

One of the problems which the technical idea of the present invention aims to solve is to provide a method which is capable of manufacturing a nanoporous multilayer graphene membrane (in particular, having a pore size at an average diameter of 10 nanometers or less) by a low-cost simplified process which was impossible with conventional techniques. Another problem to be solved is to easily form nanopores with a small diameter for polycrystalline multilayer graphene in order to manufacture a large-area nanoporous graphene membrane since a large-area graphene inevitably possesses grain boundaries.

For efficient production of graphene, many studies are being carried out on methods in which graphite is subjected to interlayer oxidation and subsequent delamination through the Hummer's method or the like to prepare monolayer graphene oxide (GO) which is later reduced to obtain reduced graphene oxide (rGO). However, since the graphene obtained in this way inevitably generates defects, it is difficult to obtain high-quality graphene, and consequently, the graphene obtained by the above method is conventionally referred to as reduced graphene oxide (rGO) to distinguish from general graphene.

With a similar principle, fine structural defects can be formed even when using a process of artificially oxidizing and reducing the surface of graphene. For application in electronic devices, high-quality graphene structures are required, and as a result, the oxidation-reduction process for a surface has been avoided as much as possible. Contrary to the above application purpose, the present invention relates to a method of easily forming nanodefects having a certain depth and/or nanopores penetrating a membrane in multilayer graphene by continuously applying a series of repeated (at least twice) oxidation-reduction processes to a surface of the multilayer graphene membrane, which has not been previously carried out to date. The multilayer graphene membrane includes a large-area polycrystalline graphene membrane with grain boundaries.

Particularly, in terms of efficient formation of nanostructured defects, rather than repeatedly performing (see FIG. 2) general oxidation-reduction processes, it is more preferable to repeatedly perform (see FIG. 3) a strong reduction etching process in which much higher energy is applied than the minimum energy required in an reduction process in the presence of the oxidation dispersed at an atomic level (e.g., a few to tens of atoms).

In order to solve the above problems, according to an aspect of the present invention, provided is a method of manufacturing a porous graphene membrane, including a first step of oxidizing a surface of multilayer graphene, a second step of reducing the oxidized surface of the multilayer graphene to carry out reductive etching of all or a part of oxidized carbon atoms which are randomly dispersed naturally (here, the term "naturally" is used to clearly distinguish from etching through a patterning mask in a random shape), and a third step of repeatedly performing a series of the first and the second steps until nanopores are formed in the multilayer graphene.

In the first step, the oxidation of the surface of multilayer graphene includes oxidizing the surface in a randomly dispersed form by controlling the oxidation amount in order not to completely oxidize the entire surface.

In the process of reductive etching of oxidized carbon atoms in the second step, reduction in which only oxygen atoms are removed from the surface without etching of carbon atoms may also occur.

The reductive etching of carbon atoms in the second step may incidentally occur in a reduction process in which a majority of oxygen atoms are removed from a surface without reductive etching of carbon atoms (carbon atoms and oxygen atoms are removed from the surface together in the reductive etching), and also in this case, an oxidation process of the first step may be a process of completely oxidizing an entire surface (see FIG. 2).

The reductive etching of the second step may be reductive etching that mainly occurs by applying strong energy on a surface compared to reduction in which only oxygen atoms are removed largely (see FIG. 3).

The multilayer graphene may consist of 10 layers or less.

The multilayer graphene may consist of two layers to six layers.

The multilayer graphene may have a different number of layers depending on the part thereof, and thus may consist of a number of layers having various sizes.

In the first step, multilayer graphene may be placed under an environment with oxygen-based radicals for oxidation of the surface of multilayer graphene membrane.

The oxygen-based radical may be at least any one selected from the group consisting of an O radical, an $O_2$ radical, an $O_3$ radical (ozone), a OH radical, and a combination thereof.

In the third step, the number of repetitions may be adjusted until nanopores penetrating the multilayer graphene are formed.

In the third step, pores formed in the multilayer graphene membrane may have an average diameter of 10 nm or less when viewed in a direction perpendicular to a graphene face.

In the second step, a multilayer graphene membrane may be heated for reductive etching. In order to heat the multilayer graphene membrane, microwaves may be applied to the multilayer graphene membrane using a microwave oven.

In the second step, laser irradiation may be applied to the surface of multilayer graphene for reductive etching.

The laser used for irradiation may be pulsed laser.

A step of clustering epoxy or hydroxyl functional groups formed by oxidation on a graphene surface through an annealing process between the first step and the second step may be further included.

In the above method, processes of the first step to the third step may be carried out after preliminarily attaching the multilayer graphene membrane on a perforated (with holes through which gas and liquid may pass in membrane separation applications) support.

In the above method, a step of removing oxidation-related chemical functional groups remaining on a graphene surface after finally obtaining a nanoporous multilayer graphene membrane may be further included.

In the present specification, oxidation means that epoxy functional groups or hydroxyl groups are formed on a surface, rather than simply losing electrons as in a battery.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
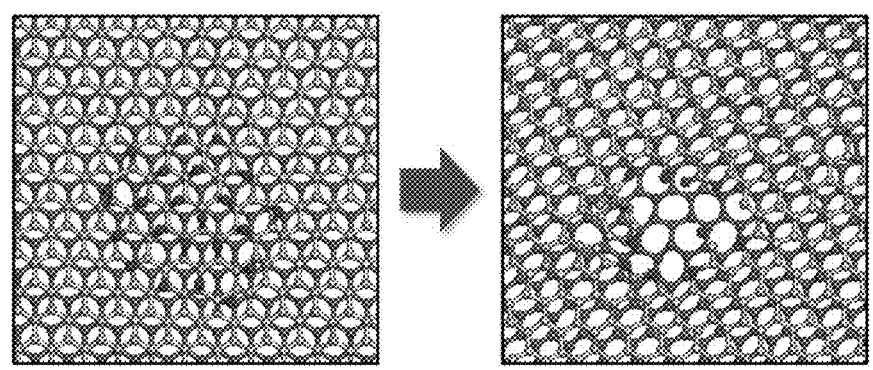
FIG. 1 are molecular dynamics simulation results showing that when carbon atoms which are oxidized at the surface of graphene which is oxidized with high dispersion at a size of 10 nanometers or less receive sufficient energy (in order to shorten the calculation time, rapid heating was applied at a temperature of 3,000 K for the sake of convenience, but in actual heating, the temperature should be lower than 3,000 K to prevent the burning of graphene. When a method of transferring momentarily strong energy to a surface is used, which is similar to ultrashort pulsed laser irradiation, an effect of raising the temperature while preventing the burning of graphene can be imparted), the oxidized carbon atoms are reductively etched to form pores, irrespective of which layer (upper or lower layer) the oxidized carbon atoms are in. For the sake of convenience, the calculation was performed for two-layer graphene, but the same application is possible for multilayer graphene with two or more layers. In this figure, red is an oxygen atom, grey is a carbon atom in the upper layer, and blue is a carbon atom in the lower layer. The left figure shows the initial structure of oxidized graphene, and the right figure shows the structure of the graphene which has been reductively etched.
Figure 1:
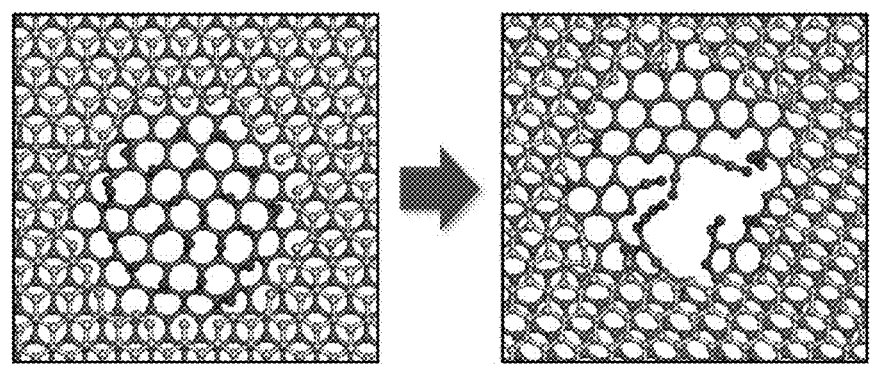

Hereinafter, the technical features of the present invention will be described in detail with reference to the accompanying figures so that those of ordinary skill in the art to which the present invention pertains can easily understand the present invention.

The terms and words used in the present specification and the claims described below should not be construed to be limited to ordinary or dictionary meanings, and based on the principle that the inventor may suitably define the concept of terms in order to describe his or her invention in the best way, it should be construed as meanings and concepts consistent with the technical idea of the present invention. Therefore, since the exemplary embodiments described in the present specification and the configurations shown in the drawings are only preferred exemplary embodiments of the present invention and are not intended to represent all of the technical ideas of the present invention, it should be understood that various equivalents and modification examples are possible.

A method of manufacturing a nanoporous graphene membrane according to an embodiment of the present invention may include a first step of oxidizing a surface of multilayer graphene (conventionally, 10 layers or less), a second step of reducing the oxidized surface of the multilayer graphene to carry out reductive etching of oxidized carbon atoms in a randomly-dispersed form, and a third step of repeatedly performing the first and the second steps at least twice until nanopores are formed in the multilayer graphene membrane.

As an example, in the first step, while the surface of multilayer graphene is oxidized, the oxidation amount may be adjusted so that the entire surface is not completely oxidized, thereby oxidizing the surface in a randomly dispersed form.

As an example, in the second step, reductive etching of carbon atoms may occur together with a reduction reaction in which only oxygen atoms are removed from the surface while carbon atoms are not removed.

As an example, the multilayer graphene membrane may have a polycrystalline form.

As an example, for the reductive etching of carbon atoms on the oxidized surface in the second step, laser irradiation may be applied to the surface.

As an example, pulsed laser may be used for the laser irradiation.

As an example, the laser irradiation with pulsed laser may be carried out by applying a laser pulse having a width of 35 to 100 femtoseconds at an intensity of 20 to 50 watts/cm$^2$ and a repetition rate of approximately 1 kHz for 1 to 3 minutes.

As an example, for the reductive etching of carbon atoms of the oxidized surface in the second step, multilayer graphene with the oxidized surface may be placed in a microwave oven for application of microwaves.

As an example, when the multilayer graphene to be heated by applying the microwaves has a polycrystalline form, the average particle size of the multilayer graphene may be greater than 0.5 mm or more.

As an example, for heating with the microwaves, microwaves at 1,200 watts may be applied to multilayer graphene with the oxidized surface for 40 to 180 seconds.

As an example, when the multilayer graphene membrane is a single-crystal material for the microwave heating, the multilayer graphene membrane may be placed in a quartz tube filled with argon gas to apply microwaves.

As an example, between the first and second steps of the process, a step of annealing oxidized graphene at a temperature which is lower than the temperature at which reductive etching occurs and higher than room temperature to cluster (*Nature Chem.* Vol. 6, 151, 2014) epoxy groups or hydroxyl groups on a graphene surface to a desired level may be further included.

As an example, after preliminarily carrying out a process of transferring a multilayer graphene membrane on a perforated board to be used as a separation membrane support, the first and second steps may be repeatedly performed.

In the first step, multilayer graphene may be placed under an environment with oxygen-based radicals for oxidation of the surface of a multilayer graphene membrane.

As an example, in the first step, at least any one substance selected from the group consisting of an O radical, an $O_2$ radical, an $O_3$ radical (ozone), a OH radical, and a combination thereof may be injected into a reactor in which multilayer graphene is placed to entirely or partly oxidize the surface of multilayer graphene by adjusting concentration, time, or the like.

As an example, in the first step, for the oxidation of a multilayer graphene membrane, after placing multilayer graphene into a chamber under a vacuum state at 0.08 Torr, oxygen plasma may be generated by flowing 30 sccm (standard cubic centimeters per minute) of oxygen gas under radio frequency (RF) electromagnetic waves at 50 kHz and 70 watts.

As an example, in the second step, a chemical substance may be used as a reducing agent for reductive etching.

As an example, after the second step, a step of exhausting reductively etched substances may be further included.

As an example, in the process, a step of removing oxygen atoms remaining on a membrane through a chemical reduction process or the like after finally obtaining a multilayer graphene membrane in which nanopores are formed may be further included.

As an example, in the third step, the number of repetitions may be adjusted until nanopores penetrating the multilayer graphene are formed.

As an example, in addition to adjusting the number of repetitions of performing a series of the first and the second steps until nanopores penetrating multilayer graphene are formed in the third step, a case in which repeated performing is stopped at a time point at which nanopores are formed in the upper layers of multilayer graphene and pores are not formed in the lower layers may be included.

An oxidation process and a reductive etching process during the first and second steps may be carried out for only one among the upper and lower surfaces of multilayer graphene.

An oxidation process and a reductive etching process during the first and second steps may be carried out for all of the upper and lower surfaces of multilayer graphene.

As an example, for the repeated process, a process of passivating a broken binding part of edge carbon atoms, which is formed by reductive etching of the second step, in the course of returning from the second step to the first step may be further included.

Figure 5A:
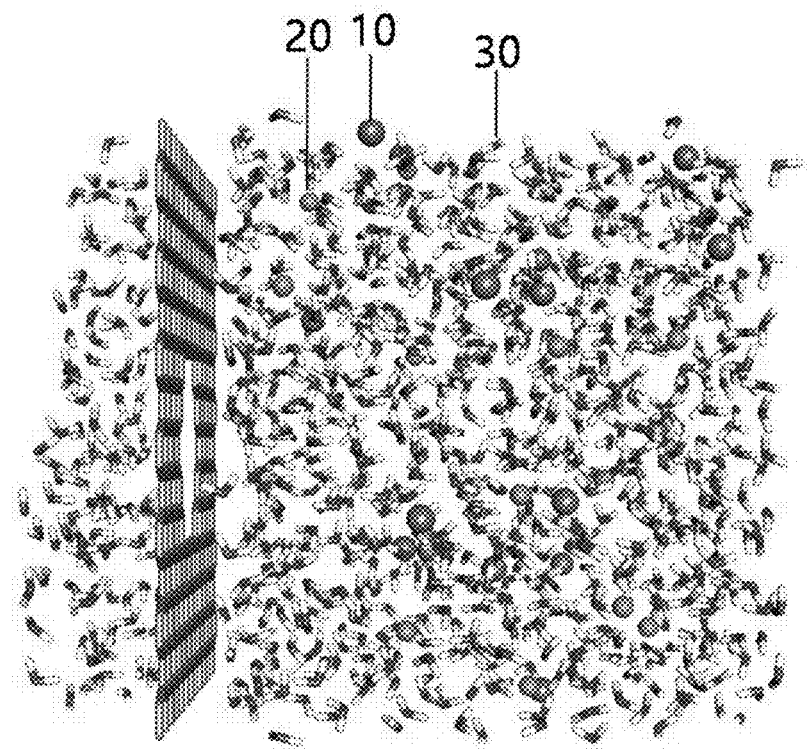
FIGS. 5A and 5B are a schematic diagram illustrating a seawater desalination process through a one-layer nanoporous graphene membrane, and a schematic diagram illustrating a seawater desalination process through a four-layer nanoporous graphene membrane, respectively (10: sodium ion, 20: chlorine ion, and 30: water molecule)
Figure 5B:
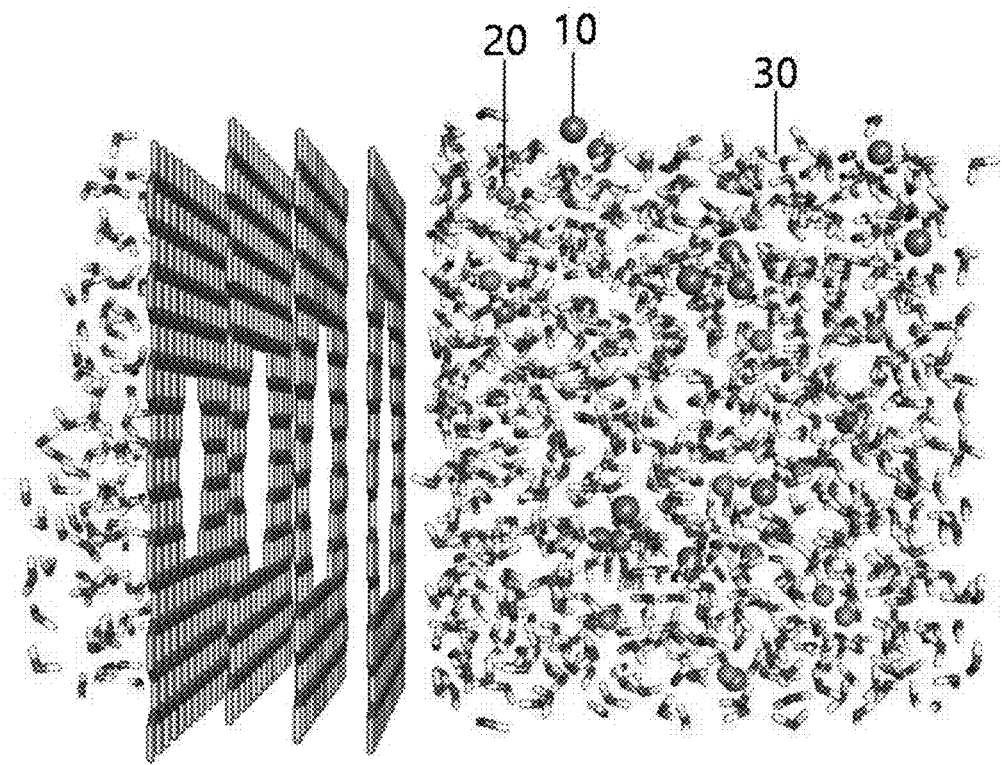
Figure 6A:
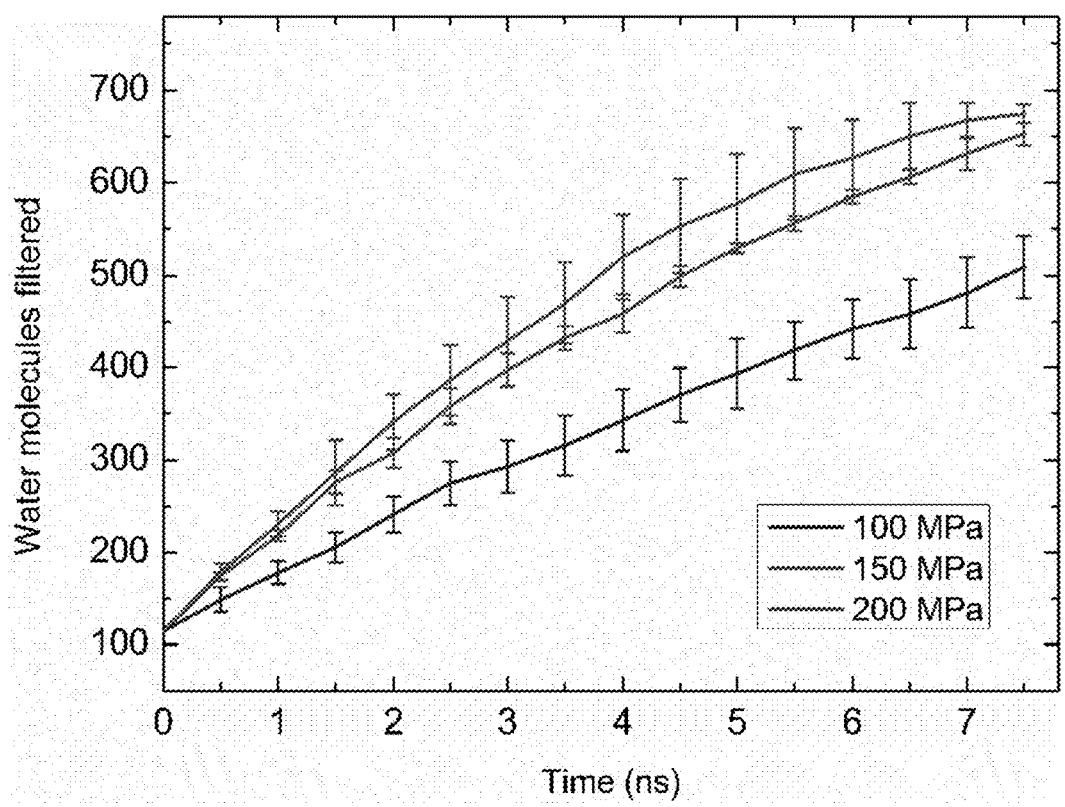
FIGS. 6A to 6D each show changes in the permeation amount of water of one-layer to four-layer nanoporous graphene membranes over time, respectively, which are obtained by the molecular dynamics stimulation method (for the amount of applied pressure, values of several orders of magnitude higher than those of conventionally applied pressures in practice were used to shorten the calculation time).
Figure 6B:
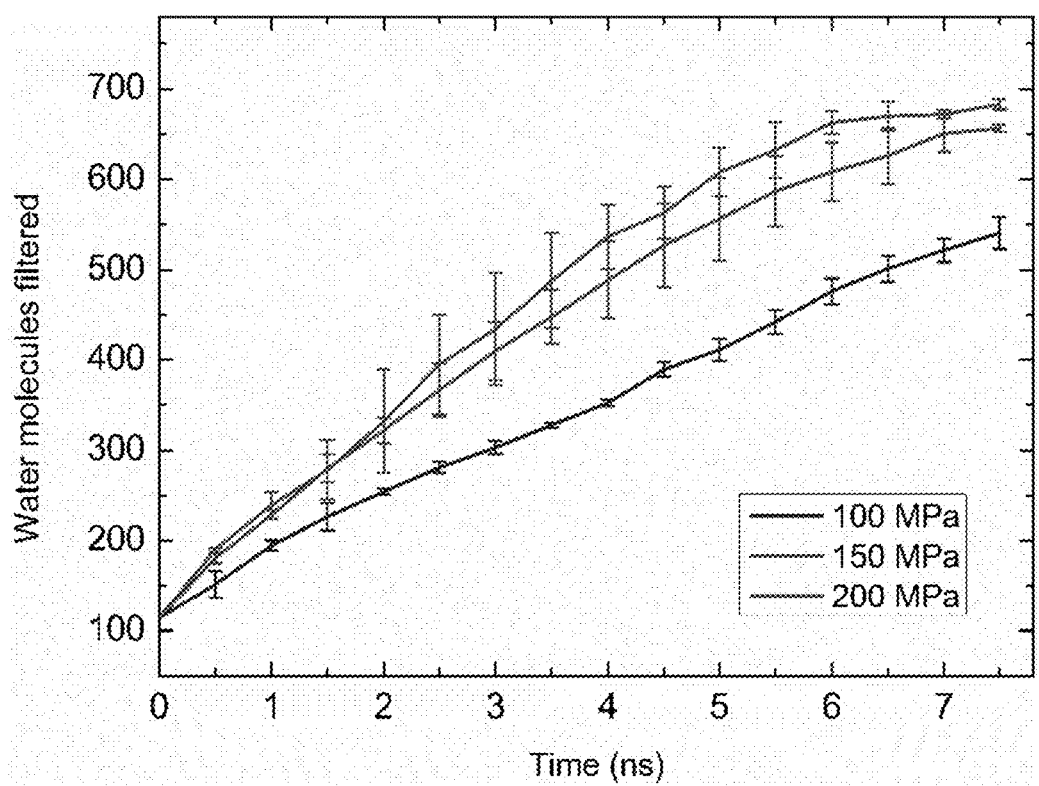
Figure 6C:
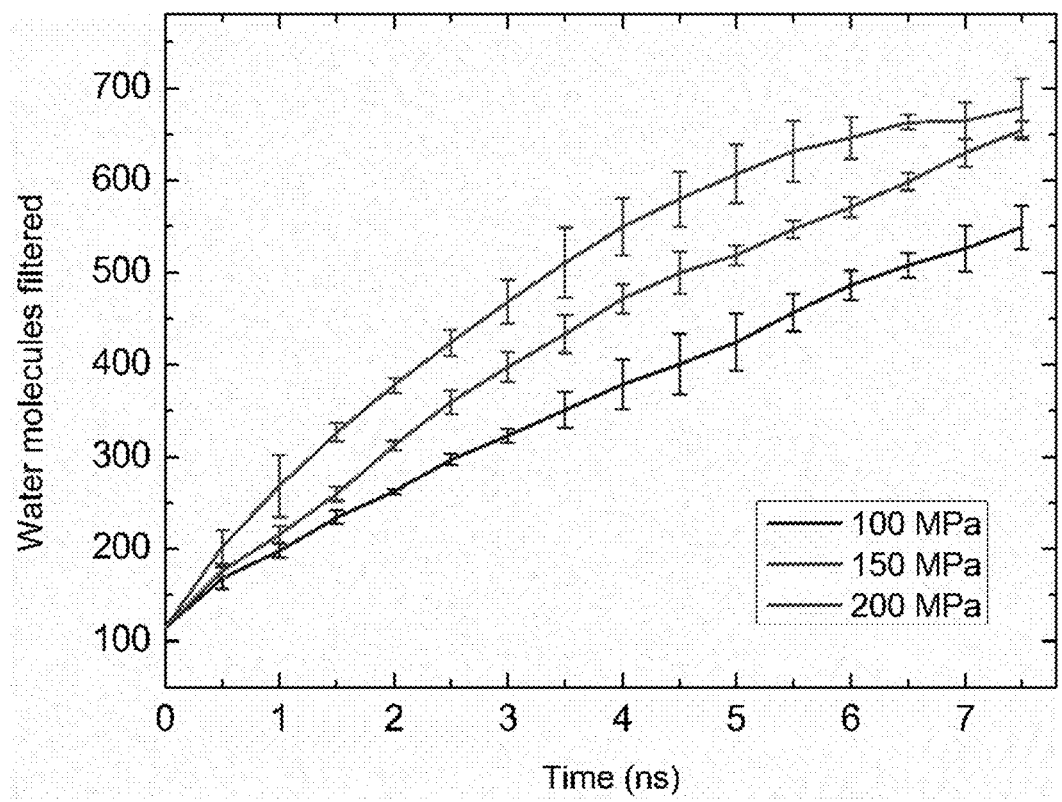
Figure 6D:
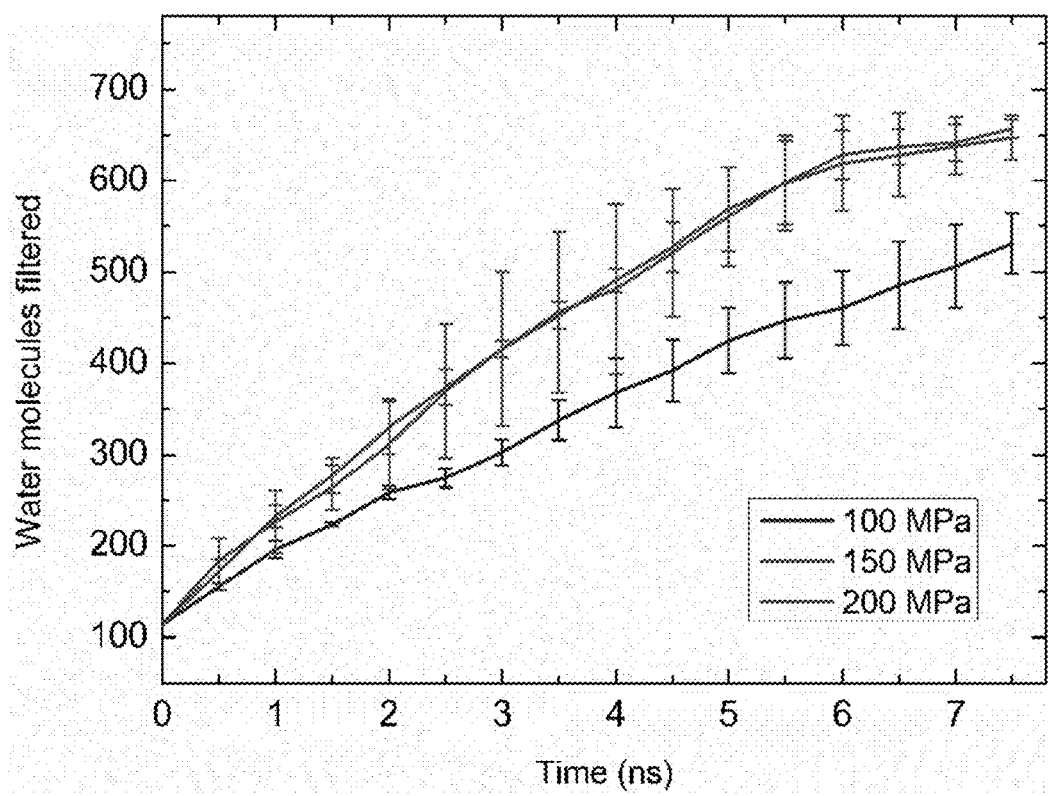

A large-area nanoporous graphene membrane can be manufactured by using the manufacturing method according to an embodiment of the present invention, and obtained nanoporous multilayer graphene membranes can be applied to ion separation, seawater desalination, and the like. FIG. 5A is a schematic diagram illustrating a seawater desalination process through a single-layer nanoporous graphene membrane, and FIG. 5B is a schematic diagram illustrating a seawater desalination process through a four-layer nanoporous graphene membrane. FIGS. 6A to 6D show the results of computer simulation of changes in the water permeation amount of a single-layer to four-layer nanoporous graphene membrane over time, respectively, and from these results, even if the number of the layers of graphene membranes increases from one to four, it can be seen that the graphene membranes exhibit similar water permeability performance.

For the sake of convenience in the calculation, the number of nanopores per unit area of the nanoporous graphene membrane is set to be 1 per 851.6 angstrom$^2$ and the diameter of the nanopores is set to be approximately 1 nm, but the actual pore density may be lower. In addition, in order to reduce calculation time, computer simulation was carried out by setting (it is possible to compute the permeation amount in proportion to pressure) a pressure applied to graphene membranes to each of 100, 150, and 200 MPa, but the actual pressure may be several orders of magnitude lower in MPa.

Figure 4:
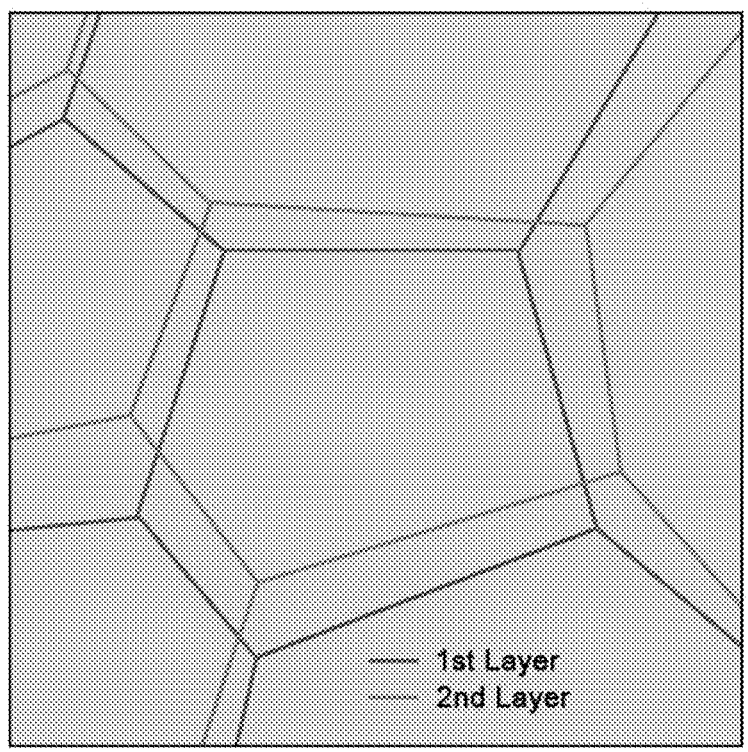
FIG. 4 is a schematic diagram showing that since the grain boundaries of the adjacent upper and lower layers in a multilayer graphene membrane are slightly misaligned with each other, buffering protection is possible between the layers even if granular etching actively occurs.

Since a multilayer graphene membrane consists of several layers of graphene, an effect in which the size of pores formed during repeated oxidation and reduction processes may be irregular due to intrinsic structural defects that may be present on a graphene layer is not significant, whereas the effect may be critical for single-layer graphene. In particular, a large-area single-layer graphene membrane inevitably has a polycrystalline form, and as a result, it is difficult to form pores of even-sized pores in graphene due to the presence of a grain boundary during a reductive etching process. On the other hand, since the positions of grain boundaries are misaligned with each other depending on layers in a large-area multilayer graphene membrane, it is possible for mutual protection and buffering between the layers to solve a problem of excessive etching of grain boundaries that may be exhibited in large-area single-layer graphene (FIG. 4). In addition, since a problem of wrinkles is markedly insignificant for a nanoporous multilayer graphene membrane compared to a single-layer graphene membrane, the nanoporous multilayer graphene membrane is advantageous in terms of processability.

Figure 2:
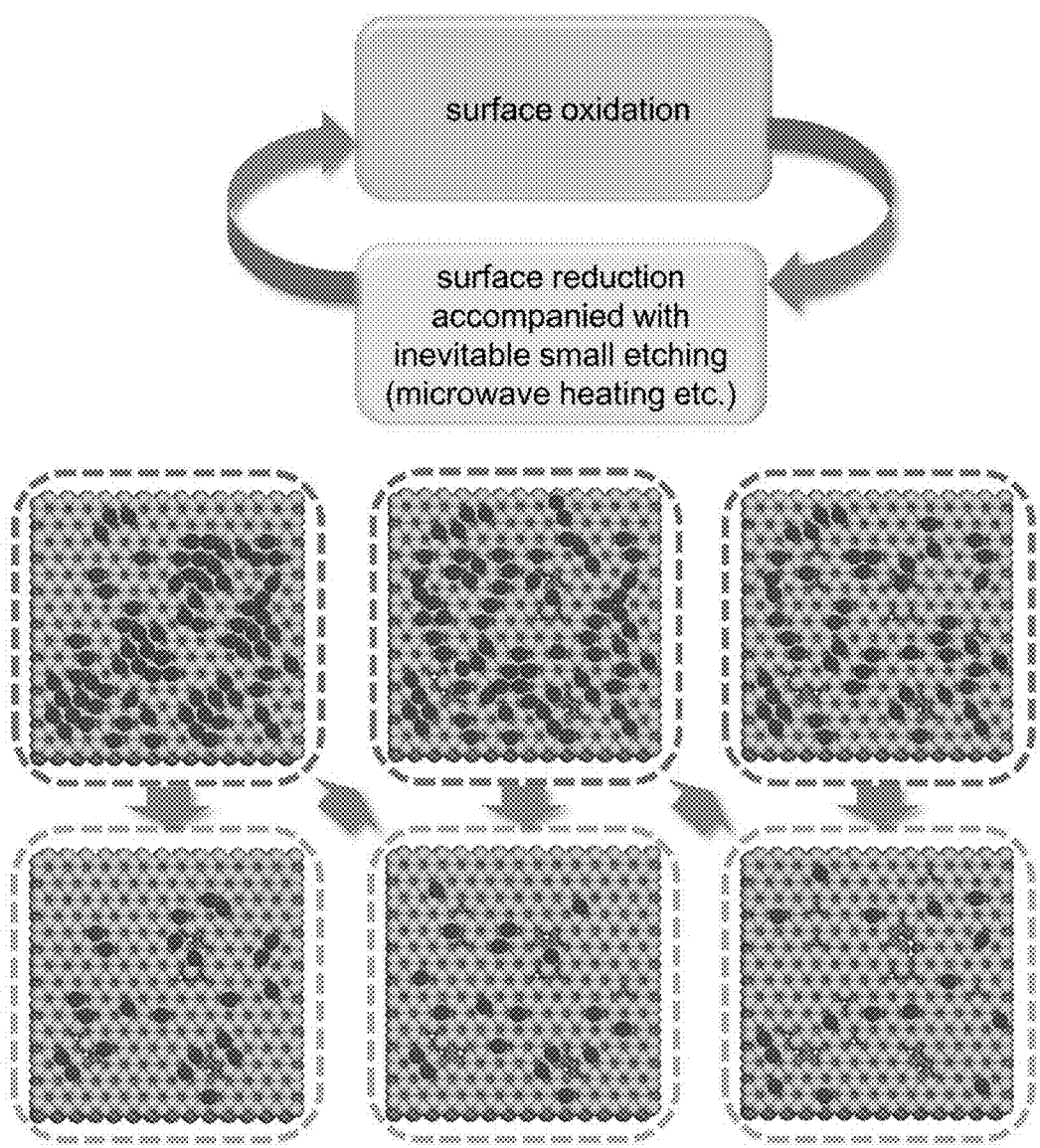
FIG. 2 is a schematic diagram showing that nanopores can be formed in multilayer graphene even when oxidation-reduction processes in which etching is significantly suppressed are used when the processes are repeatedly performed (note that during a reduction process, a part in which only oxygen atoms are removed without etching of carbon atoms is much greater than a part in which oxygen atoms are removed with carbon atoms). Red is an oxygen atom, grey is a carbon atom in the upper layer, blue is a carbon atom in the lower layer, and steps that are represented in pink and yellow green indicate an oxidation process and a reduction process, respectively.
Figure 3:
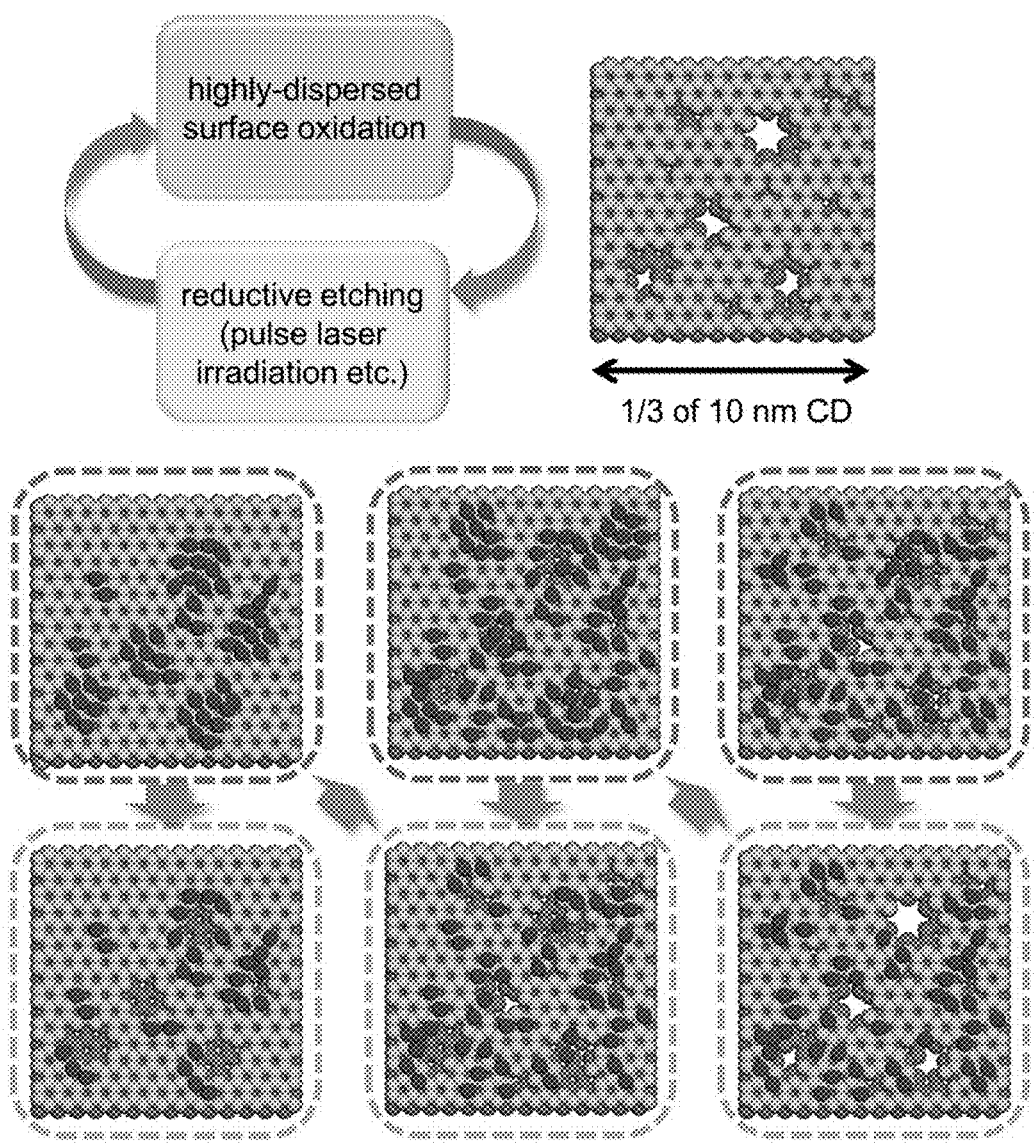
FIG. 3 is a schematic diagram exemplarily illustrating a process (see the lower figure) in which a multilayer graphene nanoporous membrane is manufactured according to the method (see the upper left figure) of an embodiment of efficient reductive etching, and a multilayer graphene nanoporous membrane (see the upper right figure) which is finally manufactured (assuming that all of the remaining oxygen atoms have been removed). Red is an oxygen atom, grey is a carbon atom in the upper layer, blue is a carbon atom in the lower layer, and steps that are represented in pink and yellow green indicate an oxidation process and a reduction process, respectively.

Compared to a patterning-based etching technique using masks which require complex processes and equipment, the manufacturing method devised in the present invention can manufacture a nanoporous membrane having pores at an average diameter of several tens of nanometers or less by a simple process at a low cost (FIGS. 2 and 3). In addition, the formation of nanopores having a diameter of several nanometers or several subnanometers, which cannot be achieved by the patterning-based etching technique, is possible because of using a fine etching phenomenon at an atomic level that occurs during reduction.

Since process steps of oxidative and reductive etching are separated in the present invention, the size of pores can be significantly reduced as compared to the formation of pores due to continuous oxygen radical attacks in conventional graphene membranes, and a problem caused by a high etching rate of intrinsic structural defects can be mitigated. In addition, since a graphene membrane on the upper layer of multilayer graphene functions to protect adsorption etching of a graphene membrane on the lower layer during a reductive etching process, the maximum size of formed pores is reduced compared to single-layer graphene, and an effect of the more uniform size distribution of pores can be achieved. A large-area nanoporous graphene membrane produced using the above method can be effectively used in various fields such as gas and ion separation, seawater desalination (FIGS. 5 and 6), and the like.

The present invention is not limited to the above-described exemplary embodiments and the accompanying drawings, but is intended to be limited only by the appended claims. Therefore, it should be understood that substitutions, modifications, and changes in various forms can be made by those of ordinary skill in the art without departing from the technical idea of the present invention as defined in the appended claims, which may also be included within the scope of the present invention.

What is claimed is:

1. A method of manufacturing a porous graphene membrane, comprising:
   a first step of oxidizing a surface of multilayer graphene, wherein the multilayer graphene is placed under an environment with oxygen-based radicals for oxidation of the surface of multilayer graphene, and the surface of multilayer graphene is oxidized in a randomly dispersed form by lowering an oxidation amount so as not to completely oxidize the entire surface;
   a second step of reducing the oxidized surface of the multilayer graphene to carry out reductive etching of oxidized carbon atoms in a randomly dispersed form; and
   a third step of repeatedly performing a series of the first and the second steps at least twice until nanopores having diameter of 0.4 to 100 nm are formed in the multilayer graphene, wherein the number of repetitions is adjusted until nanopores penetrating the multilayer graphene are formed.

2. The method of claim 1, wherein the multilayer graphene consists of 10 layers or less.

3. The method of claim 1, wherein the multilayer graphene has a polycrystalline form.

4. The method of claim 1, wherein the oxygen-based radical is at least any one selected from the group consisting of an O radical, an $O_2$ radical, an $O_3$ radical (ozone), a OH radical, and a combination thereof.

5. The method of claim 1, wherein the nanopores penetrating the multilayer graphene have an average diameter of less than 10 nm when viewed in a direction perpendicular to a graphene face.

6. The method of claim 1, wherein, in the third step, the number of repetitions is adjusted to a time point at which the nanopores are formed in a first layer of the multilayer graphene and the nanopores are not formed in a second layer of the multilayer graphene.

7. The method of claim 1, further comprising:
   a process of passivating a broken binding part of edge carbon atoms, which is formed by the reductive etching of the second step, if returning from the second step to the first step for a repeated process of the third step.

8. The method of claim 1, wherein, in the first and second steps, oxidative and reductive etching processes are carried out on only a surface multilayer graphene.

9. The method of claim 1, wherein, in the first and second steps, oxidative and reductive etching processes are carried out on both surfaces of multilayer graphene.

10. The method of claim 1, further comprising:
a step of clustering epoxy functional groups or hydroxyl functional groups formed by oxidation on a graphene surface through an annealing process between the first step and the second step.

11. The method of claim 1, wherein processes of the first step to the third step are carried out after preliminarily attaching the multilayer graphene on a perforated support.

12. The method of claim 1, further comprising:
a step of removing oxidation-related chemical functional groups remaining on a graphene surface after finally obtaining a nanoporous multilayer graphene membrane.

13. The method of claim 1, wherein, in the second step, multilayer graphene is heated by microwaves for reductive etching.

14. The method of claim 13, wherein an average particle size of the multilayer graphene to be heated by microwaves is 0.5 mm or more when the multilayer graphene has a polycrystalline form.

15. The method of claim 1, wherein, in the second step, laser irradiation is applied to the surface of multilayer graphene for reductive etching.

16. The method of claim 15, wherein the laser used for irradiation is pulsed laser.

* * * * *